UNITED STATES PATENT OFFICE.

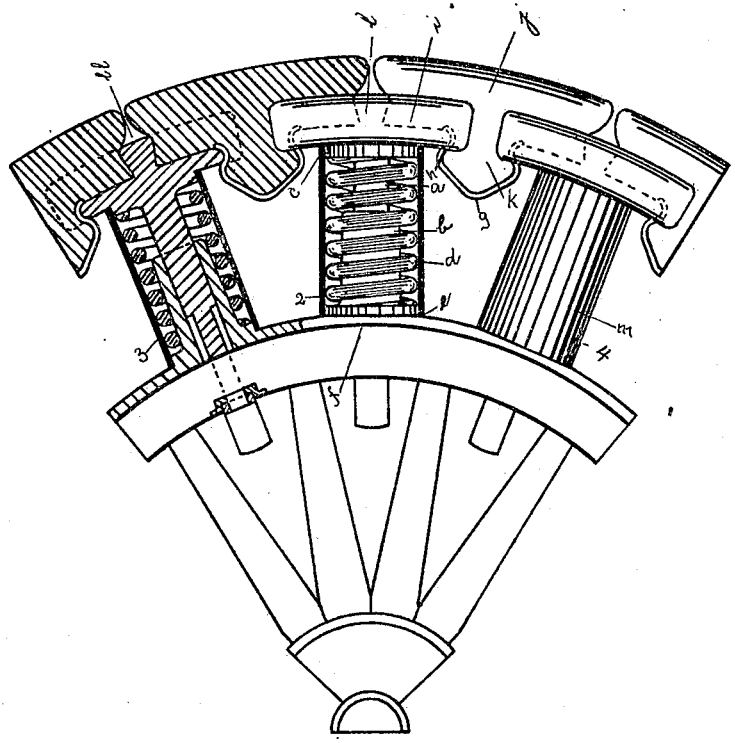

WILLIAM G. MARR, OF SPRINGFIELD, MASSACHUSETTS, ASSIGNOR OF ONE-THIRD TO JAMES P. HILLARD AND ONE-THIRD TO RICHARD J. TALBOT, OF SPRINGFIELD, MASSACHUSETTS.

FLEXIBLE RIM FOR VEHICLE-WHEELS.

No. 807,839.  Specification of Letters Patent.  Patented Dec. 19, 1905.

Application filed March 1, 1905. Serial No. 247,902.

*To all whom it may concern:*

Be it known that I, WILLIAM G. MARR, a citizen of the United States, residing at Springfield, in the county of Hampden and Commonwealth of Massachusetts, have invented a new and useful Tire or Flexible Rim for Vehicles, Automobiles, Motor - Cycles, Bicycles, and Cars, of which the following is a specification.

My invention relates to improvements in tires or rims for wheels used in automobiles, motor-cycles, bicycles, cars, and other vehicles; and the objects of my improvements are, first, to provide a flexible surface for such wheels which will reduce the jar and wear on a vehicle to a minimum; second, to provide a durable wheel and tire for vehicles so arranged with springs as to present on the rim of said wheel and at the surface of said tire a flexible surface; third, to provide a tire or running-surface for wheels that can be easily fitted to vehicles, especially to automobiles and similar machines or vehicles, affording a running-surface for such wheels that greatly reduces the vibration in comparison with solid-rubber or metal tires and has the advantage over pneumatic tires in that it is more indestructible. I attain these advantages by the mechanism illustrated in the accompanying drawing, in which the figure represents a section of a wheel fitted with said device, the part of said drawing numbered 3 showing a section of said device with the outside covering removed.

$a$ represents a rod, piston, or piece of metal so arranged as to move within the socket, which is represented at $b$, the said socket being fitted so that said rod or piece of metal $a$ will move in said socket, the said socket forming a bearing-surface for said rod $a$. The upper part of said rod is so arranged as to form a receptacle for the upper part of spring $d$ and support for the running-surface or tire of said wheel. $c$ represents the upper part of said rod or piston $a$. $d$ represents a spiral spring so arranged as to extend between the upper part of said rod at $c$ to the lower part of said socket at $e$, the weight and size of said spring being arranged according to the size and weight of the vehicle upon which said device is fitted, the purpose of said spring being to regulate the movement of said rod $a$ in the socket $b$. $e$ represents the base of the socket $b$, the same being so arranged as to form a support for the base of said spring $d$. $f$ represents the point of attachment of said device to the rim of a wheel, and the same is provided with a place for oiling the bearing-surface of said rod $a$ and said socket $b$. $g$ represents a metal spring which rests upon the upper surface of the head of rod $a$ at $h$ and extends to the corresponding part of the next section of said device. The said spring $g$ is also so arranged as to form a bearing-surface for the rubber section $j$, the said spring being so shaped as to have a tendency to hold said rubber section $j$ more securely in place and being fitted between each spring-section of said device, preventing said sections from twisting out of place, but not making the device entirely rigid. $i$ represents a side flange of the head of said rod $a$, the said flange being fitted on each side of said head and being so arranged as to form a side support for the rubber section $j$. $j$ represents the outer surface of said device, being the running-surface of said tire or wheel. It also serves to connect the sections of said device containing said springs, the said sections of said device corresponding to the sections represented by figures 2, 3, and 4 and hereinbefore described, being arranged upon the surface of said wheel, as shown in said device, at equal distances upon the whole outer surface of said wheel. $k$ represents the portion of said rubber which extends below the upper part of the metal head of said rod and into the chamber formed by the curve of the spring $g$. $l$ represents an arrangement of the metal surface on the upper part of said bolt-head or receptacle for said rubber surface so arranged that when said rubber is vulcanized or otherwise placed in position the peculiar shape of said device at 1 will hold said rubber more securely in place. A sectional view of said device 1 is shown at 11 on section 3, the said section 3 being a view of said rod $a$, socket $b$, and spring $g$. $m$ represents a rubber or cloth covering so arranged as to exclude dust and dirt from said spring and bearing-surfaces of said device. The said covering $m$ is shown in place at 4 and is so arranged as to stretch between the point represented by $c$ and point represented by $e$ covering the parts before mentioned and excluding dust and mud therefrom. I prefer to use in this device, on the running-surface of the same, rubber or a composition made partly of rubber and partly of other substances; but it is apparent that any substance may be used which will afford a running-surface for said wheel, whether said substance be metal, cloth, leather, or a composition.

What I claim as my invention, and desire to secure by Letters Patent, is—

1. In combination with a wheel for vehicles, sections, each having a spiral spring, a metal rod, a socket for said rod and a cover, fitted to the spokes or on the rim of a wheel, a flat spring between each spring-section curving in the center toward the hub of said wheel, a sectional tire, each tire-section bearing on two spring-sections and on the spring between each of said spring-sections, substantially as specified.

2. In a vehicle-wheel having spring-sections, a curved spring between the spring-sections supporting the rubber, cloth or leather surface of the lower part of the tire in the chamber formed by its curvature, substantially as specified.

Signed at Springfield, Massachusetts, this 27th day of February, 1905.

WILLIAM G. MARR.

Witnesses:
GEORGE T. SMITH,
HORACE C. HAYES,